United States Patent [19]

Helser et al.

[11] 3,895,096

[45] July 15, 1975

[54] METHOD OF PRODUCING HYDROUS CALCIUM SILICATE PRODUCTS AND THE PRODUCTS THEREOF

[75] Inventors: Jerry L. Helser, Hebron; Richard F. Shannon, Lancaster, both of Ohio

[73] Assignee: Owens-Corning Fiberglas Corporation, Toledo, Ohio

[22] Filed: Sept. 10, 1973

[21] Appl. No.: 395,886

[52] U.S. Cl................. 423/331; 106/40 R; 423/155
[51] Int. Cl............................................. C04b 33/00
[58] Field of Search ...... 423/155, 331, 326; 106/40, 106/74, 86

[56] References Cited
UNITED STATES PATENTS 3,458,329   7/1969   Owens............................. 106/40 R
3,501,324   3/1970   Kubo ................................. 423/331

*Primary Examiner*—P. D. Rosenberg
*Attorney, Agent, or Firm*—Carl G. Staelin; John W. Overman; Patrick P. Pacella

[57] ABSTRACT

An improvement in a process of manufacturing hydrous calcium silicate products is disclosed. The products are prepared from a molded aqueous slurry of reactive cementitious materials, organic reinforcing fibers and glass reinforcing fibers. By employing tripoli as one of the reactive siliceous materials, a marked improvement in the product is achieved.

8 Claims, No Drawings

3,895,096

METHOD OF PRODUCING HYDROUS CALCIUM SILICATE PRODUCTS AND THE PRODUCTS THEREOF

This invention relates to a process for manufacturing hydrous calcium silicate products and to the products thereof.

The term hydrous calcium silicate denotes a crystalline compound formed by the reaction of lime ($CaO$), silica ($SiO_2$), and water ($H_2O$). The two hydrous calcium silicates that generally are of interest are: tobermorite having the formula $4\ CaO\ .\ 5\ SiO_2\ .\ 5\ H_2O$; and xonotlite, having the formula $5\ CaO\ .\ 5\ SiO\ .\ X\ H_2O$. Hydrous calcium silicate products often are used as heat insulating materials.

Methods for reacting and drying a molded aqueous slurry of reactive cementitious constituents and reinforcing fibers to form hydrous calcium silicate insulation products are known in the art. One such method includes placing a molded slurry of the reactive cementitious constituents and reinforcing fibers in an autoclave, introducing pressurized saturated steam into the autoclave to indurate the slurry, and removing the product from the autoclave. Another such method includes placing a molded slurry of the reactive cementitious constituents and reinforcing fibers in an autoclave, introducing pressurized saturated steam into the autoclave to indurate the slurry, simultaneously further indurating and drying the slurry with superheated steam to convert the slurry to a final product, reducing the pressure in the autoclave to atmospheric pressure, and removing the products.

Recently, we have applied these processes to the production of hydrous calcium silicate insulation products reinforced with a combination of glass fibers and organic fibers. It was found that the strength of the final product could be significantly increased. We discovered that by employing tripoli as one of the reactive siliceous materials, a marked improvement in the strength of hydrous calcium silicate insulation products is acieved.

Accordingly, an object of this invention is to provide a process for manufacturing hydrous calcium silicate products reinforced with a combination of glass fibers and organic fibers.

Another object is to provide hydrous calcium silicate products reinforced with a combination of glass fibers and organic fibers.

Other objects, aspects and advantages of this invention will be apparent to one skilled in the art from the following disclosure and appended claims.

In practice the principal slurry constituents, i.e. calcareous and siliceous materials, reinforcing fibers and water are mixed to form a slurry which is then molded to impart a predetermined shape to the slurry and final product. The slurry is molded or shaped in any convenient manner. Generally, however, one of two types of molds is employed, i.e. pan molds or filter press molds. In pan molds, the slurry remains in the mold while the cementitious materials are reacted to convert them to a hydrous calcium silicate insulation. A pan mold generally defines a mold cavity of a particular shape and dimension; e.g. a flat rectangular pan is used to form flat ware or blocks, while an arcuate, generally U-shaped mold forms half-section insulation pieces used to form molded pipe covering for insulating pipes, ducts, and the like. The filter press mold generally comprises a perforated molding surface over which the slurry is poured. A perforated mechanical piston, complementary in shape to the mold, compresses the slurry and dewaters it to the point where it is self-supporting. The filter press molding technique is described in U.S. Pat. No. 2,699,097 and is used to form pipe covering and flat ware.

One method disclosed herein introduces pressurized, saturated steam into a closed system or autoclave in sufficient amount to bring the pressure in the autoclave to 100 to 350 psi at a temperature ranging from 212°–406°F. in 30 minutes or less and preferably within 15 to 30 minutes after the introduction of the steam begins. (The term "pressure" as used herein refers to gauge pressure (in pounds per square inch), i.e. the pressure above that of the atmosphere.)

The slurry then is maintained under this steam pressure in the autoclave for a period of time sufficient to indurate the slurry. After the product has been removed from the autoclave, it can be dried in an auxiliary drier, if required. The drying temperature in the auxiliary drier must be below the decomposition point of the organic fiber reinforcement to achieve best possible strength of the product.

The other method disclosed herein introduces pressurized, saturated steam into a closed system or autoclave in sufficient amount to bring the pressure in the autoclave to 100 to 350 psi in 30 minutes or less and preferably within 15 to 30 minutes after the introduction of the steam begins. (The term pressure as used herein refers to gauge pressure (in pounds per square inch), i.e. the pressure above that of the atmosphere.) After introduction of the steam, the temperature in the autoclave is raised by heating coils to temperatures ranging from about 407° to about 600°F. to produce the superheated steam.

The slurry is then maintained in the autoclave until a predetermined percentage of the moisture (by weight) of the ware has been removed by evaporation into the superheated steam atmosphere. The free moisture is reduced substantially during the cycle, but never drops below 10% by weight of solids during the entire cycle. While continuing to circulate the steam in the system, the pressure in the autoclave is reduced to atmosphere conditions within 60 minutes or less and the final product is removed. The product subsequently can be dried in an auxiliary drier, is required. The drying temperatures in the auxiliary drier must be below the decomposition point of the organic fiber reinforcement, or a brittle product is obtained. The retention of at least 10 percent by weight-free moisture in the molded slurry allows for simultaneous indurating and drying in an autoclave at temperatures above the decomposition point of the reinforcing organic fibers.

The specific lime to silica ratio of the slurry is dependent primarily upon the desired type of crystalline hydrous silicate desired in the final product. For example, if it is desired to obtain a crystalline product predominantly comosed of a crystalline matrix structure of the type commonly referred to as xonotlite ($5\ CaO\ .\ 5\ SiO_2\ .\ H_2O$), a $CaO/SiO_2$ mol ratio of approximately 1/1 would be utilized in the slurry. If the desired crystalline product is tobermorite having the formula $4\ CaO\ .\ 5\ SiO_2\ .\ 5\ H_2O$, a $CaO/SiO_2$ mol ratio ranging from 0.75/1 to 0.80/1 would be employed in the slurry. In general, the $CaO/SiO_2$ molar ratio ranges from 0.65/1 to 1.3/1.

Control of the density of the resultant pan product is primarily accomplished by controlling the relative amount of water utilized in the make-up of the slurry. For example, an apparent density of 11 pounds per cubic foot, which may be considered a nominal apparent density, would be obtained utilizing a slurry having a ratio of water to total dry solids of approximately 6:1.

Tripoli is a porous, siliceous rock resulting from the natural decomposition of siliceous sandstone. The various grades of tripoli, according to fineness, are rose, cream and white. Tripoli often is referred to as rotten stone. Tripoli is a sort of diatomaceous earth, but is not to be confused with diatomaceous earths which consist chiefly of amorphous silica derived from fossil diatoms. Deposits of tripoli are found in the Missouri-Oklahoma district and in southern Illinois. The terms microcrystalline silica and cryptocrystalline often are used in reference to tripoli.

Tripoli has been described in an article published in March of 1962 in *Industrial Medicine and Surgery* by Carey P. McCord, M.D. entitled "Tripoli and Tripolite" and in an article published in 1953 by the State of Illinois entitled "Siliceous Materials of Extreme Southern Illinois" by J. E. Lamar.

The amount of tripoli is included in the total amount of reactive $SiO_2$ employed in the invention. Generally, 25.0 to 75.0 weight percent of the total amount of reactive silica is tripoli, preferably 40.0 to 60.0 weight percent. The silica content of tripoli is 99.5 ±0.5 percent.

The other siliceous materials employed in this invention include portland cement, siliceous sand, quartz, diatomaceous earth, clays, silica gel, pozzolana, perlite, and the like and mixtures thereof.

The calcareous materials used in this invention include portland cement, quick lime, slaked lime and the like and mixtures thereof.

The organic materials of this invention are cellulosic fibers such as fibers of wood pulp, cotton, straw, bagasse, wood flour, hemp, rayon and the like. A preferred pulp fiber is bleached softwood pulp.

Alkali resistant glass fibers that can be employed with the cellulose material include those disclosed in British Patent Specification Nos. 1,243,972 and 1,290,528 and in U.S. Pat. No. 8,840,379. The $ZrO_2$ and $TiO_2$ containing compositions described in application Ser. No. 275,613 provide a unique combination of alkali-resistance, low liquidus temperature and desirable viscosity for the fiberization of glass compositions and for the reinforcement of cementitious materials. The glass compositions of U.S. Pat. No. 8,840,379 have the following range of proportions by weight: $SiO_2$, 60 to 62%; CaO, 4 to 6%; $Na_2O$, 14 to 15%; $K_2O$, 2 to 3%; $ZrO_2$, 10 to 11% and $TiO_2$, 5.5 to 8%.

The organic materials generally have a fiber diameter of 30 microns or less, as in the case of cotton fibers, and may average less than 1 micron in fiber diameter as in the case of wood pulp. The glass fibers will generally have a diameter of less than 0.001 inch. The glass fibers have a length of from 0.25 to 2.0 inch, desirably from 0.5 to 1.25 inch, and preferably from 0.625 to 1.00 inch.

Specific composites and processes embodying the principles of this invention are set forth in the following examples:

EXAMPLE I

| Materials (Pan Batch) | Dry Weight Percent |
|---|---|
| Glass Fiber | 1.8 |
| Wood Pulp | 8.4 |
| Quicklime | 31.9 |
| Tripoli | 21.9 |
| Diatomaceous Earth | 16.0 |
| Filler (Calcium Silicate Dust) | 9.7 |
| Bentonite Clay | 3.9 |
| Limestone | 3.9 |
| Liquid Sodium Silicate | 2.6 |
| | 100.1 |
| Calcium/silica ratio | 0.77 |
| Water/solids ratio | 4.8/1 |

A dispersion of the various materials was made in water with the above water-to-solids ratio. The dispersion was produced in a hydropulper, placed in U-shaped mold forms and prehardened in a steam atmosphere at a temperature of 190°F. These half-section insulation pieces are pipe covering with a thickness of 2 inches. The U-shaped molds filled with the dispersion then are placed in an autoclave. After the autoclave was sealed, the pressure in the autoclave was raised to 250 psi over a 15 minute cycle, following which the molds were subjected to saturated steam at this pressure for 60 minutes to indurate the dispersion. The temperature in the autoclave then was raised by heating coils to 575°F. to produce superheated steam which slowly indurated and dried the insulation over a further 175-minute period. The autoclave then was depressurized one-half hour a one-half-hour period, and the molds were removed from the autoclave. The pipe insulation so produced had a free moisture content of at least 10 percent by weight of solids, a modulus of rupture of 75 psi and a hardness of 44 mm penetration. In all of the Examples, the modulus of rupture is determined according to ASTM Specification C446-64 and hardness is determined according to ASTM Specification C569-68.

EXAMPLE II

The process of Example I was repeated except that the following batch composition and water-to-solids ratio were employed:

| Materials (Pan Batch) | Dry Weight Percent |
|---|---|
| Glass Fiber | 2.0 |
| Wood Pulp | 9.2 |
| Quicklime | 19.6 |
| Diatomaceous Earth | 32.9 |
| Filler (Calcium Silicate Dust) | 10.5 |
| Bentonite Clay | 4.2 |
| Portland Cement | 18.4 |
| Liquid Sodium Silicate | 3.2 |
| | 100.0 |
| Water/solids ratio | 5.0/1 |

The pipe insulation so produced had a free moisture content of at least 10 percent by weight of solids, a modulus of rupture of 42 psi and a hardness of 85 mm penetration.

EXAMPLE III

The process of Example I was repeated except that the following batch composition, calcium-to-silica ratio and water-to-solids ratio were employed.

| Materials (Pan Batch) | Dry Weight Percent |
| --- | --- |
| Glass Fiber | 2.0 |
| Wood Pulp | 8.6 |
| Quicklime | 19.5 |
| Crystalline Silica | 16.0 |
| Diatomaceous Earth | 17.3 |
| Filler (Calcium Silicate Dust) | 12.0 |
| Bentonite Clay | 3.2 |
| Portland Cement | 18.3 |
| Liquid Sodium Silicate | 3.2 |
| | 100.1 |
| Calcium/silica ratio | 0.74 |
| Water/solids ratio | 5.1/1 |

The pipe insulation so produced had a free moisture content of at least 10 percent by weight of solids, a modulus of rupture of 56 psi and a hardness of 44 mm penetration.

EXAMPLE IV

The process of Example I was repeated except that the following batch composition, calcium-to-silica ratio and water-to-solids ratio were employed.

| Materials (Pan Batch) | Dry Weight Percent |
| --- | --- |
| Glass Fiber | 1.5 |
| Wood Pulp | 8.4 |
| Quicklime | 25.3 |
| Tripoli | 19.1 |
| Diatomaceous Earth | 16.4 |
| Filler (Calcium Silicate Dust) | 9.9 |
| Bentonite Clay | 4.0 |
| Portland Cement | 12.4 |
| Liquid Sodium Silicate | 3.1 |
| | 100.1 |
| Calcium/silica ratio | 0.76 |
| Water/solids ratio | 4.8/1 |

The pipe insulation so produced had a free moisture content of at least 10 percent by weight of solids, a modulus of rupture of 75 psi and a hardness of 40 mm penetration.

A comparison of the modulus of rupture and the hardness of Examples I and IV with the modulus of rupture and hardness of Example II and III reveals the marked improvement of employing tripoli in the production of crystalline hydrous calcium silicate insulation products reinforced with a combination of glass fibers and organic fibers. In Examples I and IV, a high modulus of rupture was achieved, while maintaining minimum penetration in the final product. These results indicate that the strength of the product was significantly higher when tripoli was employed in the batch composition.

While the invention has been described in considerable detail, we do not wish to be limited to the particular embodiments shown and described, and it is our intention to cover hereby all novel adapations, modifications and arrangements thereof which come within the practice of those skilled in the art to which the invention relates.

We claim:

1. In the process of manufacturing a hydrous calcium silicate insulating product comprising the steps of:
   a. placing a molded aqueous slurry of calcareous and silicate materials stabilized with from 1.0 to 20.0 percent by weight of total solids of organic fibers and with from 0.1 to 10.0 percent by weight of total solids of glass fibers in an autoclave;
   b. indurating the slurry with pressurized, saturated steam;
   c. simultaneously indurating and drying the slurry with superheated steam to convert the slurry to a hydrous calcium silicate product; and
   d. reducing the pressure in the autoclave to atmospheric pressure prior to removal of the product, wherein at least 10 percent by weight of solids of free moisture is retained in the slurry and the product during the four steps of the process until completing step (d) and removing the product from the autoclave; the improvement comprising employing tripoli as one of the siliceous materials wherein 25.0 to 75.0 weight percent of the siliceous materials is tripoli.

2. The process of claim 1 wherein 40.0 to 60.0 weight percent of the siliceous materials is tripoli.

3. The process of claim 1 wherein the calcareous and siliceous materials have a $CaO/SiO_2$ molar ratio ranging from 0.65 to 1.3/1.

4. Hydrous calcium silicate insulating products produced by the process of claim 1.

5. In the process of manufacturing a hydrous calcium silicate insulating product comprising the steps of:
   a. placing a molded aqueous slurry of calcareous and siliceous materials stabilized with from 1.0 to 20.0 percent by weight of total solids of organic fibers and with from 0.1 to 10.0 percent by weight of total solids of glass fibers in an autoclave;
   b. indurating the slurry with pressurized, saturated steam; and
   c. removing the product from the autoclave; the improvement comprising employing tripoli as one of the siliceous materials wherein 25.0 and 75.0 weight percent of the siliceous materials is tripoli.

6. The process of claim 5 wherein 40.0 to 60.0 weight percent of the siliceous materials is tripoli.

7. The process of claim 5 wherein the calcareous and siliceous materials have a $CaO/SiO_2$ molar ratio ranging from 0.65/1 to 1.3/1.

8. Hydrous calcium silicate insulating products produced by the process of claim 5.

* * * * *